US011494512B2

(12) United States Patent
Sarferaz

(10) Patent No.: US 11,494,512 B2
(45) Date of Patent: Nov. 8, 2022

(54) AUTOMATIC ENFORCEMENT OF DATA USE POLICY FOR MACHINE LEARNING APPLICATIONS

(71) Applicant: SAP SE, Walldorf (DE)

(72) Inventor: Siar Sarferaz, Heidelberg (DE)

(73) Assignee: SAP SE, Walldorf (DE)

( * ) Notice: Subject to any disclaimer, the term of this patent is extended or adjusted under 35 U.S.C. 154(b) by 622 days.

(21) Appl. No.: 16/427,018

(22) Filed: May 30, 2019

(65) Prior Publication Data
US 2020/0380155 A1 Dec. 3, 2020

(51) Int. Cl.
*G06F 21/62* (2013.01)
*G06F 16/2455* (2019.01)
*G06F 16/28* (2019.01)
*G06N 20/00* (2019.01)

(52) U.S. Cl.
CPC ...... *G06F 21/6227* (2013.01); *G06F 16/2455* (2019.01); *G06F 16/284* (2019.01); *G06N 20/00* (2019.01)

(58) Field of Classification Search
CPC .............................. G06N 20/00; G06F 16/284
See application file for complete search history.

(56) References Cited

U.S. PATENT DOCUMENTS

| 10,706,046 | B2* | 7/2020 | Werner | G06F 16/24534 |
| 2013/0212103 | A1* | 8/2013 | Cao | G06F 16/215 707/737 |
| 2019/0392345 | A1* | 12/2019 | Adaska | G06N 5/04 |
| 2020/0153701 | A1* | 5/2020 | Mohan | H04L 41/147 |
| 2020/0380399 | A1* | 12/2020 | Weider | G06F 16/285 |

* cited by examiner

*Primary Examiner* — Abiy Getachew
(74) *Attorney, Agent, or Firm* — Klarquist Sparkman, LLP

(57) ABSTRACT

Techniques and solutions are described for restricting data that is provided to a machine learning application. Restrictions can be based on use status information, such as use status information associated with a retention manager and indicating whether data is blocked from use. Data identifiers used by a cloud-based system can be correlated with archiving objects of a local system so that the cloud-based system can receive use status information to avoid using blocked data. Restrictions can include restricting data based on whether a data subject has provided consent that allows the data to be used by the machine learning application. A data view can be defined that filters query results to those where consent exits. The data view can join, such as an inner join, a table providing consent information with a data having data subject data.

20 Claims, 10 Drawing Sheets

```
SELECT * FROM I_SALESORDER
INNER JOIN CMD_CNSNT
    ON I_SALESORDER~SoldToParty = CMD_CNSNT~DATA_SUBJECT_ID            320a
    AND I_SALESORDER~BillingCompanyCode = CMD_CNSNT~CONTROLLER_NAME    324a
INNER JOIN PurposeEntityFunctionalAttributes
    ON PurposeEntityFunctionalAttributes~purpose_name =
CMD_CNSNT~PURPOSE_NAME INNER JOIN PurposeFunctionalAttributes
    ON PurposeFunctionalAttributes~purpose_name = CMD_CNSNT~PURPOSE_NAME
WHERE CMD_CNSNT~DATA_SUBJECT_ID_TYPE = 3 "customer            336a
    AND CMD_CNSNT~CONTROLLER_TYPE = 1 "company code           320b
    AND PurposeEntityFunctionalAttributes~cds_view_name = 'I_SALESORDER' AND
    I_SALESORDER~SalesOrderType = ,OR'                                 328b
    AND (                          332
        ( CMD_CNSNT~WITHDRAWN_AT = 0 AND CMD_CNSNT~VALID_FROM < @lv_now ) AND
        ( CMD_CNSNT~WITHDRAWN_AT = 0 AND CMD_CNSNT~VALID_TO > @lv_now )
      OR
        ( CMD_CNSNT~WITHDRAWN_AT > 0 AND CMD_CNSNT~WITHDRAWN_AT > @lv_now ) AND
        ( CMD_CNSNT~WITHDRAWN_AT > 0 AND CMD_CNSNT~VALID_FROM < @lv_now ) AND
        ( CMD_CNSNT~WITHDRAWN_AT > 0 AND CMD_CNSNT~VALID_TO > @lv_now )
    )                                                                  336b
AND PurposeFunctionalAttributes~action = 'Profiling' AND
    PurposeFunctionalAttributes~aspect = 'Material'
INTO TABLE @DATA(lt_data).                                   336c
```

FIG. 3

| Component | Component Type | Data Type | Length | Description |
|---|---|---|---|---|
| REC_ID | GENE_REC_ID | CHAR | 32 | Record ID |
| DATASOURCE | ROOSOURCE | CHAR | 30 | Data Source |
| ILM_OBJECT | GENE_OBJECT | CHAR | 30 | ILM Object |
| NOTIF_MODE | GENE_NOTIF_MODE | CHAR | 2 | Notif Mode |
| NOTIF_TMSTMP | GENE_TMSTMP_NOTIFD | DEC | 21 | Notification Date |
| BLOCKING_DATE | GENE_TMSTMP_BLCK | DEC | 15 | Blocking Date |
| EXPIRATION_DATE | GENE_TMSTMP_EXPD | DEC | 15 | Expiration Date |
| SRC_GUID | GENE_SEC_GUID | CHAR | 32 | Source GUID |
| ILM_KEY_VALUES | GENE_KEY_VALUES | CHAR | 1333 | ILM Key Values |

FIG. 7

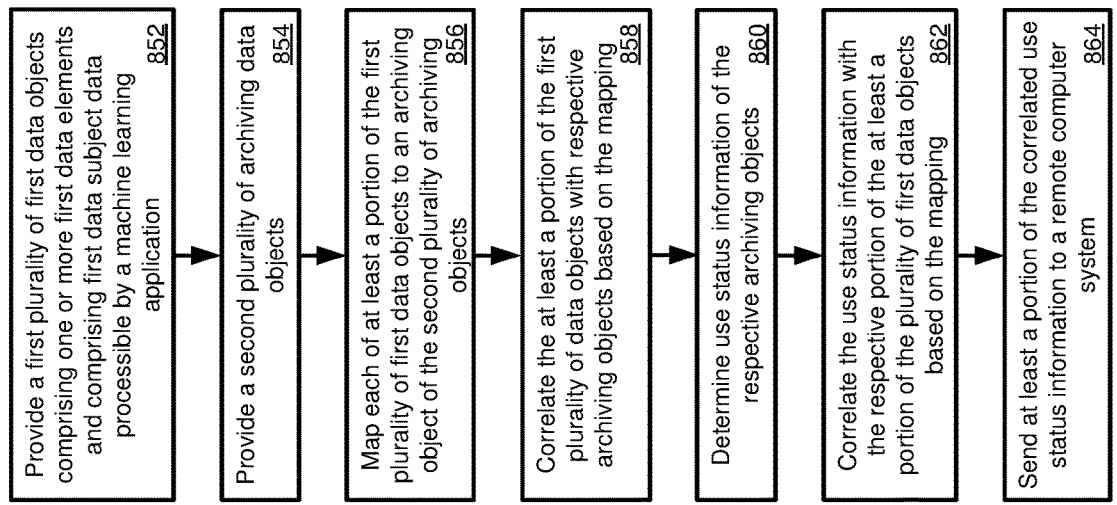
FIG. 8C
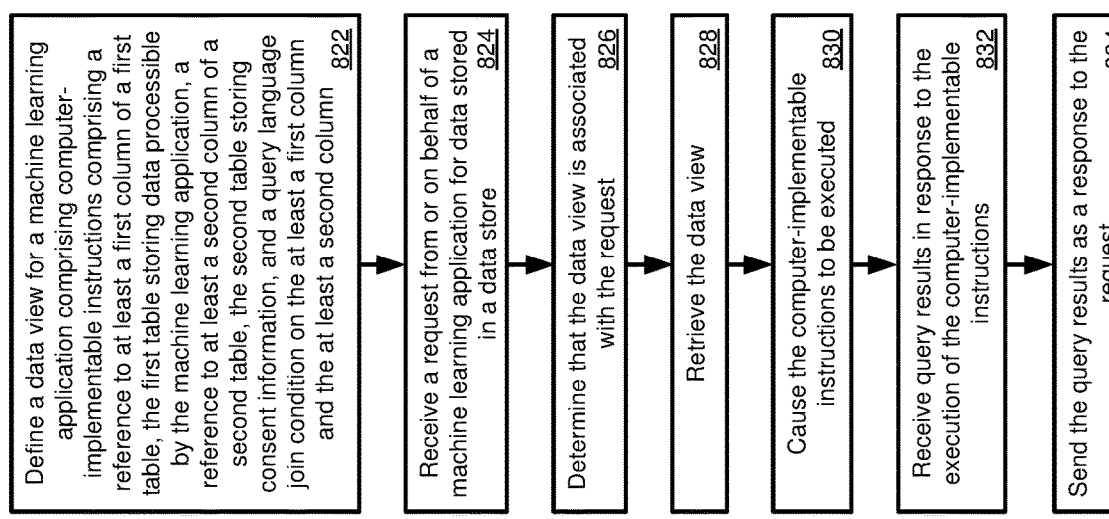
FIG. 8B
FIG. 8A

AUTOMATIC ENFORCEMENT OF DATA USE POLICY FOR MACHINE LEARNING APPLICATIONS

FIELD

The present disclosure generally relates to managing stored data. Particular implementations relate to automatically enforcing use policies for stored data, such as data used in machine learning applications.

BACKGROUND

As ever-increasing amounts of electronic records and data are generated, it becomes of greater concern as to how such records and data are maintained, including for archival purposes. That is, periodically, for example when the records and data are not actively being used, such information may be archived. Archiving can help make efficient use of computer resources, such as putting less used data on less expensive storage media.

In some cases, data must be maintained for particular time periods, whether as "active" data or as archived data. These time periods can be specified by an organizational policy or by various laws, regulations, contractual obligations, and the like.

Apart from resource-use and retention period considerations, data retention and data use are increasingly driven by data privacy and data protection laws and regulations. That is, a data subject (which can be a person or a legal entity, such as an organization) can have a proprietary interest in data that concerns the entity. The data subject may be able to request, such as under applicable laws or regulations of a jurisdiction, that an organization delete their data or "forget" them. If the data subject wishes to be forgotten, but policy or legal provisions allow an organization to maintain data regarding the data subject (at least for some additional time), the data subject's data may be subject to access restrictions, such as limiting access to the data to certain users or restricting use of the data to limited purposes. Even for "active" data, a data subject may only have consented to their data being used for particular purposes.

It can be complex to determine whether particular data can be used for particular purposes, particularly when data is stored in different systems and the "answer" may change over time. Thus, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for restricting data that is provided to a machine learning application. Restrictions can be based on use status information, such as use status information associated with a retention manager and indicating whether data is blocked from use. Data identifiers used by a cloud-based system can be correlated with archiving objects of a local system so that the cloud-based system can receive use status information to avoid using blocked data. Restrictions can include restricting data based on whether a data subject has provided consent that allows the data to be used by the machine learning application. A data view can be defined that filters query results to those where consent exits. The data view can join, such as an inner join, a table providing consent information with a data having data subject data.

In one aspect, a method is provided for restricting data available to a machine learning application using use status information, such as use status annotations provided by a retention manager. A request is received from or on behalf of a machine learning application for data stored in a data store, such as data maintained in a relational database. A data view associated with the request is retrieved. The data view includes computer-implementable instructions to retrieve a first selected portion of data from the data store. The computer-implementable instructions also include instructions to filter, and not return in response to the request, a second portion of data selected from the first selected portion of data. The second portion of data, that is not returned, corresponds to data of the first selected portion of data having an indicator that a given data element of the first selection portion of data has been blocked from use.

The computer-implementable instructions are caused to be executed. For example, the instructions can cause a query to be executed at the database. Query results are received in response to the execution of the computer-implementable instructions. The query results are sent as a response to the request.

In another aspect, a method is provided for using a data view that includes a query language join operation to restrict data provided to a machine learning application to data that complies with a data protection or data privacy policy, such as data that is associated with consent of a data subject that permits the data to be used by the machine learning application. A data view is defined for use with a machine learning application. The data view includes computer-implementable instructions for retrieving data from a database. The data view includes a reference to at least a first column of a first table of a relational database system. The first table stores data processible by the machine learning application. The data view includes a reference to at least a second column of a second table of the relational database system. The second table stores consent information. The data view includes a query language join condition on the at least a first column and the at least a second column.

A request is received from or on behalf of a machine learning application for data stored in a data store, such as the relational database system. It is determined that the data view is associated with the request. The data view is retrieved. The computer-implementable instructions of the data view are caused to be executed. Query results are received in response to the execution of the computer-implementable instructions. The query results are sent as a response to the request.

In a further aspect, a method is provided for providing use status information to a remote computing system. A first plurality of first data objects is provided. A first data object, generally, includes one or more first data elements and comprises first data subject data processable by a machine learning application. A second plurality of archiving objects are provided. An archiving object can define a use status of one or more second data objects. A second data object can include, or can be associated with, one or more second data elements. The second data elements can be second data subject data, which can be, or can correspond to first data subject data. For example, an archiving object can include a reference to data of the first plurality of data objects, or can have data that is equivalent to data of the first plurality of data objects.

At least a portion of the first plurality of first data objects are mapped to an archiving object of the second plurality of archiving objects. The at least a portion of the first plurality of data objects are correlated with respective archiving objects of the second plurality of archiving objects based on the mapping. Use status information of the respective archiving objects is determined. The use status information of the respective archiving objects is correlated with the respective at least a portion of the first plurality of first data objects based on the mapping. At least a portion of the correlated use status information is sent to a remote computer system.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 3 is an example static SQL statement that can be used in a data view to restrict data accessed by a machine learning algorithm to data that complies with a data protection or data privacy policy, such as being associated with data subject consent.

FIG. 7 illustrates a table defining a schema for a table that can be used to store use status information that can be associated with an archiving object and a data object.

FIGS. 8A-8C are flowcharts illustrating operations in disclosed methods of providing query results to a machine learning application that comply with a data protection or data privacy policy.

DETAILED DESCRIPTION

Example 1

Overview

Figure 1:
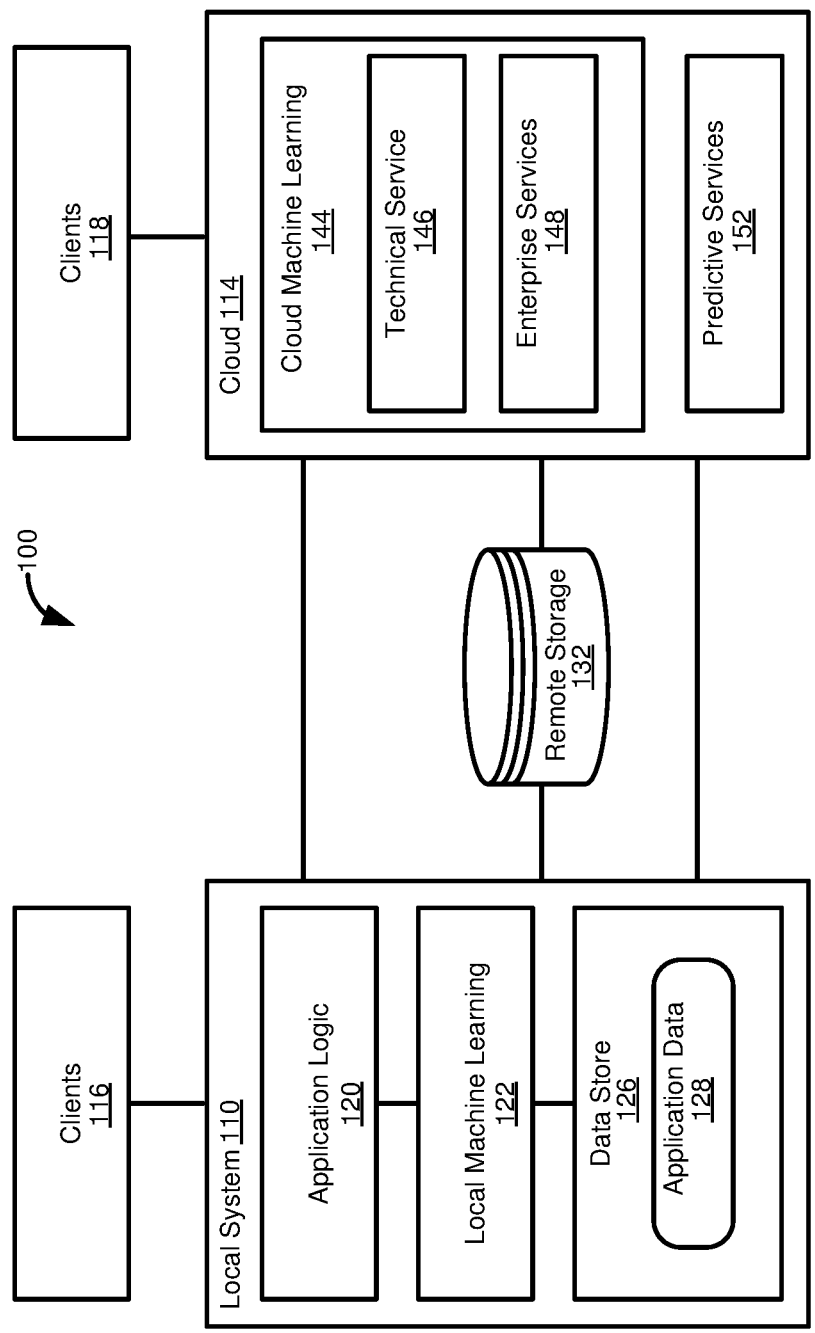
FIG. 1 is a diagram of a system architecture having a local system and a cloud system, where each system can provide machine learning functionality.

As ever-increasing amounts of electronic records and data are generated, it becomes of greater concern as to how such records and data are maintained, including for archival purposes. That is, periodically, for example when the records and data are not actively being used, such information may be archived. Archiving data can make more efficient use of computer resources, such as putting less used data on less expensive storage media.

In some cases, data must be maintained for particular time periods, whether as "active" data or as archived data. These time periods can be specified by an organizational policy or by various laws, regulations, contractual obligations, and the like.

Apart from resource-use and retention period considerations, data retention is increasingly driven by data privacy laws and regulations. That is, a data subject (which can be a person or a legal entity, such as an organization) can have a proprietary interest in data that concerns the entity. The data subject may be able to request, such as under applicable laws or regulations of a jurisdiction, that an organization delete their data or "forget" them. If the data subject wishes to be forgotten, but policy or legal provisions allow an organization to maintain data regarding the data subject (at least for some additional time), the data subject's data may be subject to access restrictions, such as limiting access to the data to certain users or restricting use of the data to limited purposes. Even for "active" data, a data subject may only have consented to their data being used for particular purposes.

It can be complex to determine whether particular data can be used for particular purposes, particularly when data is stored in different systems and the "answer" may change over time. For example, updates to a use status (e.g., a retention status or a description of any authorized purposes for which the data may be used) may be made at a first system. Data use violations may occur if such updates are not propagated to other systems that use the data, including systems which may have copies of the data. Another complication can be that, even if data is "marked" for deletion, for example, or as being unavailable for certain types of uses, software applications may not be designed to process data using such markings.

As a particular example, machine learning techniques are finding ever more mainstream applications. Data maintained by an enterprise can be used for various purposes in machine learning techniques, such as being used to train a model (e.g., to train a classifier), being analyzed by a machine learning technique (e.g., being analyzed by a classifier), or being included as part of a "question" posed to a machine learning technique. Often, once a machine learning model is developed, the data of individual users is no longer sensible from the model. That is, for example, the data of an individual user may have contributed to a weight given to a particular parameter in a model, but there is no way to "back calculate" the user's data from that weight. So, generating a machine learning model may raise data privacy or data use concerns, but continued use of a model that was developed in compliance with data use restriction may not present a problem.

The use of data that may be subject to use restrictions can be particularly challenging in machine learning applications given that multiple systems may be involved in a particular task. For example, some machine learning tasks may be performed on a local system, where at least some of the data is maintained locally (or remotely, where the local system is part of a system that has access to any remote data, including having suitable software and access privileges for the data). In other cases, the local system may request a remote computing system to perform machine learning tasks, such as sending task requests to a cloud-based computer system that provides machine learning applications. Hybrid approaches may also be used, such as having some tasks, particularly less computationally or data intensive tasks, being performed by a local system, and having other tasks performed remotely, such as using a cloud-based system that may offer significantly greater computational power.

The above approaches can provide flexibility, but can also complicate data compliance efforts. For example, involving a remote system, such as a cloud system, can involve replicating data to, or for use by, the cloud system. If data is deleted at a local or system level, or otherwise indicated as no longer useable for machine learning tasks, the data at the remote system should also be deleted, or have its use restricted, in a similar manner In an analogous manner, if a remote system is involved, that remote system should be configured to read and honor any "markings" that may indicate that data should not be used for a particular purpose.

The present application provides techniques for managing data used in machine learning applications (e.g., where an "application" can be a software application that provides machine learning functionality, or an "application" can be a particular use case that involves a machine learning technique and that can be carried out using a software application). Disclosed techniques can take advantage of one or more statuses or actions that may exist with respect to data that may, at least sometimes and in some cases, be available for particular uses, such as in machine learning applications.

One status or action can be data deletion. Data, which may have previously been stored, and potentially available for use in machine learning applications, can be marked for deletion, and deleted. Deletion can be carried out manually, or automatically, in at least some cases. For example, data can be associated with an identifier, such as a timestamp, that indicates an event whose occurrence will result in deletion of the data. In the case of a timestamp, the data can be automatically deleted, or a user prompted to delete the data, when a current time satisfies (e.g. is on or after) the date indicated by the timestamp. Or, data deletion can be indicated in another manner, such as being triggered in response to a request, such as a request by a user who is a data subject of the data, or in response to execution of a policy that the data is subject to. As will be described, a data deletion event can include sending notifications to one or more systems, including to at least one remote system, that identified data should be deleted.

In some cases, data may not be "active" data, such as data available for use by software applications, but may still be required to be stored. For example, an enterprise may no longer have a legal right to use data of data subject, but other legal requirements may require that the enterprise maintain the data, at least for a period of time (after which, for example, the data may be deleted). Data that is to be maintained, but is not actively used, can be referred to as blocked data. Data can be marked as blocked, and made unavailable for use, such as for use in machine learning applications.

Even for "active" data, as discussed above, it can be important to ensure that data is only used for authorized purposes. For example, some data may only be used when a data subject has provided consent for their data to be used. Consent may be provided in a granular way. That is, a data subject may consent to their data being used for some purposes, but not others. Consent for a particular purpose can change over time. Consent can expire, or be withdrawn, in some cases. Thus, disclosed technologies can facilitate restricting data used for machine learning applications to data where the proposed use is consistent with the consent (or other authorization) that exists for the data.

FIG. 1 illustrates an architecture 100 in which disclosed technologies can be used. Generally, the architecture 100 includes a local system 110 and a cloud-based system 114, which can have respective clients 116, 118. The local system 110 can include application logic 120, which can be logic associated with one or more software applications. The application logic 120 can use the services of a local machine learning component 122.

The local machine learning component 122 can include one or more machine learning algorithms, and optionally one or more specific tasks or processes. For instance, the local machine learning component 122 can have functionality for conducting an association rule mining analysis, where the application logic 120 (including as directed by an end user) can call the associated function of the local machine learning component. In carrying out the requested function, the local machine learning component 122 can retrieve application data 128 from a data store 126, such as a relational database management system. Alternatively, all or a portion of data to be used by the local machine learning component 122 can be provided to the local machine learning component by the application logic 120, including after being retrieved by, or on behalf of, the application logic from the data store 126.

The application logic 120 can store, or cause to be stored, data in a remote storage repository 132. The remote storage repository 132 can be, for instance, a cloud-based storage system. In addition, or alternatively, the application logic 120 may access data stored in the remote storage repository 132. Similarly, although not shown, in at least some cases, the local machine learning component 122 may access data stored in the remote storage repository 132.

The local system 110 may access the cloud-based system 114 (in which case the local system may act as a client 118 of the cloud-based system). For example, one or more components of the cloud-based system 114 may be accessed by one or both of the application logic 120 or the local machine learning component 122. The cloud-based system 114 can include a cloud machine learning component 144. The cloud machine learning component 144 can provide various services, such as technical services 146 or enterprise services 148. Technical services 146 can be data analysis that is not tied to a particular enterprise use case. Technical services 146 can include functionality for document feature extraction, image classification, image feature extraction, time series forecasts, or topic detection. Enterprise services 148 can include machine learning functionality that is tailored for a specific enterprise use case, such as classifying service tickets and making recommendations regarding service tickets.

The cloud system 140 can include predictive services 152. Although not shown as such, in at least some cases the predictive services 152 can be part of the cloud machine learning component 144. Predictive services 152 can include functionality for clustering, forecasting, making recommendations, detecting outliers, or conducting "what if" analyses.

Although shown as including a local system 110 and a cloud-based system 114, not all disclosed technologies require both a local system 110 and a cloud-based system 114, or innovations for the local system need not be used with a cloud system, or vice versa. The following examples discuss in more detail how functionality can be added to one or both of the local system 110 or the cloud-based system 114 in order to improve compliance with data processing restrictions, particularly when data is used for machine learning purposes.

The disclosed technologies can provide various advantages. For example, disclosed technologies can facilitate compliance with data processing restrictions by dynamically determining what data may be used in a machine learning application at the time the machine learning application attempts to request or process the data. Such dynamic determination can be facilitated through the use of data views, where a data view can include conditions that exclude, for example, blocked data, or which join tables of data subject data with tables relating to consent policies to help ensure only unblocked data, for which consent exists for a given purposes, is provided to a machine learning application. Data views with these conditions can automatically be created for machine learning applications, or requests from machine learning applications, to help an enterprise comply with data privacy and data protection considerations.

In the case of a cloud-based system, a local system can communicate use status updates to the cloud-based system. Such communications may be upon request of the cloud-based system, or may be pushed to the cloud-based system by the local system. For example, a cloud-based system can register for use status updates to particular collections of data. When the cloud-based system receives a use status update (or a delete notification sent in response to a use status update being determined), the cloud-based system can delete the relevant data, or otherwise cause the data not to be used for machine learning applications.

Example 2

Figure 2:
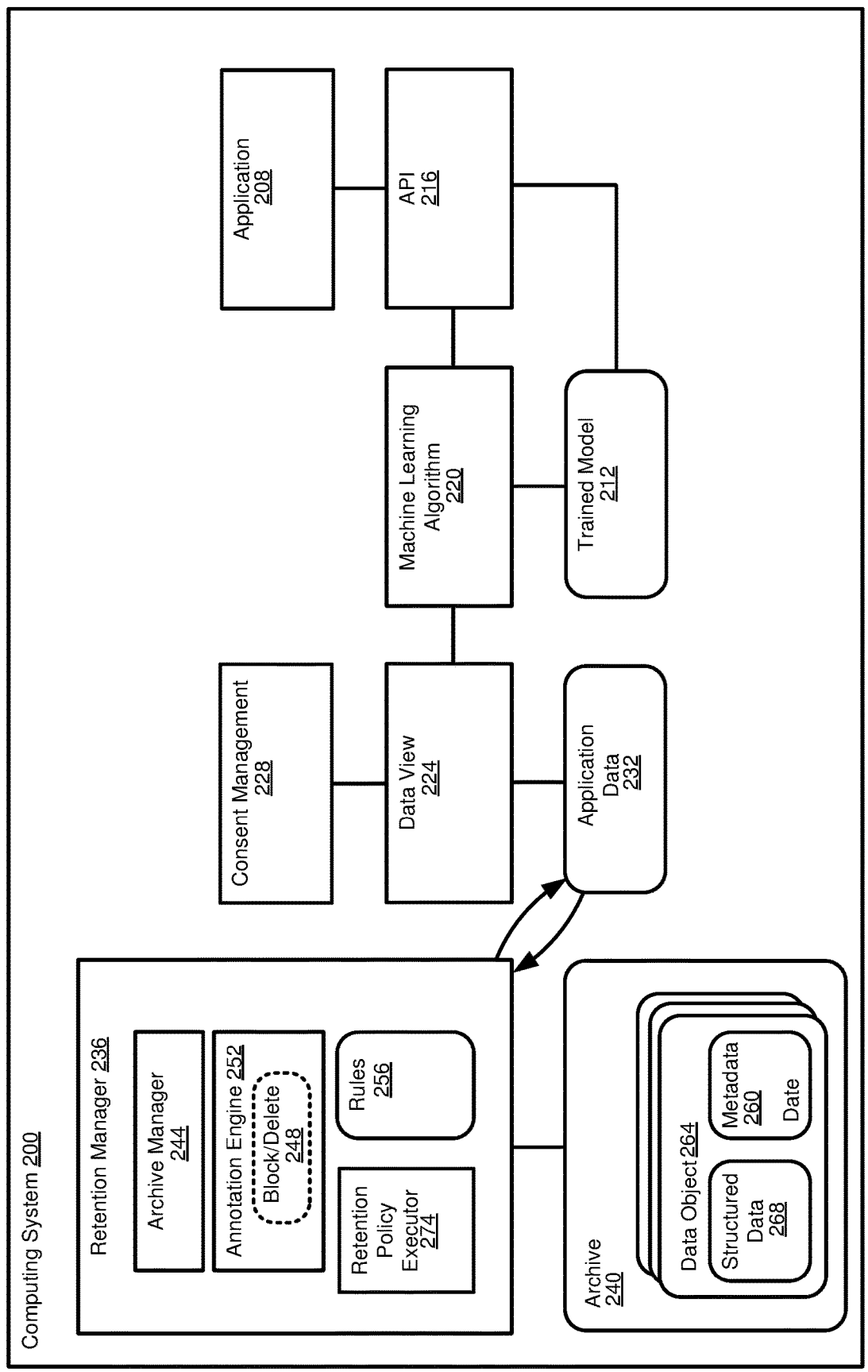
FIG. 2 is a diagram of a system architecture where a data view can be used to restrict access to data based on annotations provided by a retention manager.

Example Architecture for Restricting Access to Data Using Data Retention Annotations FIG. 2 illustrates components of a computing system 200 that can be used in disclosed technologies. The computing system 200 can be, in some examples, the local system 110 of FIG. 1. The computing system 200 can include one or more machine learning applications 208. A machine learning application 208 can be part of the local machine learning component 122 of FIG. 1. A machine learning application 208 can access a trained model 212, such as by calling a method provided by an API 216. The machine learning application 208 may also call a machine learning algorithm 220, such as by calling another method provided by the API 216. In a specific example, a method of the API 216 can be called to create the trained model 212, and another method can be called to access the trained model. As discussed in Example 1, at least some trained models 212 may not raise data protection concerns, as the data for particular data subjects cannot be determined from the trained model.

The machine learning algorithm 220 can access data, such as for use in generating the trained model 212, or in conducting an analysis using the trained model, through a data view 224. The data view 224 can be, in specific implementations, a Core Data Services view of SAP SE of Walldorf, Germany More generally, a data view 224 can be portion of data 232 (e.g., application or data subject data, which can be stored in a database or other data store) that is persisted for the view (and may be periodically updated), or which is generated on the fly when the view is called. The data view 224 can be defined at least in part using a query language statement, or code or other instructions that can be converted to a query language statement, such as a SQL statement. As will be further described, the data view 224 can be used to filter data to be retrieved such that blocked data is not included in data provided to the machine learning algorithm 220.

The data view 224, including as defined with respect to functionality of a consent management component 228, can retrieve at least a portion of application data 232. Application data 232 may be data generally available to the application 208 (e.g., available to the application if not subject to data privacy/data protection prohibitions), and can be stored in a data repository, such as in one or more database tables. All or a portion of the application data 232 can be annotated with information that can be used by the data view 224 to restrict data returned to the application 208. The application data 232 can be annotated, for example, with information identifying various consent policies, rules, or definitions available in the consent management component 228, or with annotations related to a retention manager 236. In some examples, the retention manager 236 can be the Information Lifecycle Management (ILM) software available from SAP SE, of Walldorf, Germany.

In some cases, data included in a data view 224 is filtered by reference to the consent management component 228. The consent management component 228, in a particular example, can be the Consent Management component available for products and services offered by SAP SE, of Walldorf, Germany. In an implementation, the data view 224 can reference consent policies and other consent-related settings of the consent management component 228.

The retention manager 236 can be at least partially responsible for tracking and updating different states of data with respect to data management criteria, such as criteria associated with data protection or data privacy requirements. In particular examples, one or both of an archive 240 or a data store hosting the application data 232 can maintain data in a relational (e.g., table) format. The tables can include one or more columns (attributes/fields) that include consent data or data management indicators (e.g., use status information), such as a flag that data is blocked. In other cases, use status information can be in other metadata associated with particular data subject data of the application data 232.

The retention manager 236 can include an archive manager 244. The archive manager 244 can receive requests to store data in the archive 240, requests to retrieve data from the archive, requests to modify data stored in the archive (including metadata), and requests 248 to block or delete data from the archive. The archive manager 244 can track whether data is active, and useable by applications (or, at least as long as other policies, such as consent, are complied with), whether the data is to be stored with other application data 232, but be blocked from use (e.g., if the data is legally required to be maintained, and is maintained with the application data), whether the data is to be moved to the archive 240 (e.g., if the data is legally required to be maintained, but is not maintained with the application data), or whether the data is to be deleted, such as from one or both of the archive 240 or the data store holding the application data 232.

If there is a change in status for data (e.g., data is to be changed from active to blocked or deleted, or from blocked to deleted), an annotation engine 252 of the retention manager 246 can issue block/delete commands 248, such as to one or both of the archive 240 or a data store hosting application data 232. The annotation engine 252 can access a rules store 256. The rules store 256 can provide rules that determine when data to be archived can be deleted or must be deleted. The rules store 256 can also provide rules that determine when access to archived data should be limited, and users, and optionally purposes, authorized to access particular data. In other cases, the annotation engine 252 can create or modify an annotation in response to another trigger, such as receipt of a suitable command from a user or from an application, such as using an API (not shown) for the retention manager 236.

Using rules of the rules store 256, the annotation engine 252 can assign one or more dates to data to be archived, such as in metadata 260 of a data object 264 stored in the archive 240. The date can be an expiration date, such as a date after which the data may be deleted, a date after which the data must be deleted, or are a combination of these dates.

The data object 264 is shown as including structured data 268 (which can be, or can correspond to, application data 232) and the metadata 260. In some cases, the metadata 260 can be incorporated into the structured data 268 (e.g., as one or more fields of structured data in the form of a table), or a data object 264 can include unstructured data in addition to, or in place of, the structured data 268.

In some cases, the annotation engine 252 can determine which rules of the rules store 138 apply to particular data using metadata associated with the data. For instance, the application data 232 of the active data store may be associated with a type depending on the source of the data (e.g., a particular application or application components that produced or acquired the data). A type may be determined by analyzing a table identifier, record identifier, field identifier, or particular table value. A type may also be determined based on a particular data type associated with the data, such as using a rule that associates particular abstract or composite data types with particular types. Rules may be determined in other ways. In particular examples, rules can be determined by the ILM or ECM software applications of SAP SE of Walldorf, Germany.

The retention manager 236 can include a retention policy executor 274. The retention policy executor 274 can, at least for some data objects 264, periodically determine if an expiration date has passed, and, if so, and there are no status flags (e.g., legal holds) set, delete the data object from the archive 240. If the date has passed, and the status flag has been set, deletion can be postponed until, and if, the status flag is cleared. For other data objects 264, the retention policy executor 274 can process requests to manually delete data objects from the archive 240. If the retention policy executor 274 determines that a date for the data object 264 has passed, and there are no status flags indicating that the data object should not be deleted, the data object can be deleted. If the expiration date has not passed, or a status flag has been set, the retention policy executor 274 does not delete the data object 264, and can return an error message in response to the deletion request.

In at least some cases, a data view 224 may retrieve data from the application data 232, but not from the archive 240. If data is deleted from the application data 232, or removed from the application data and placed in the archive 240, it is no longer available to the data view 224. However, data of the application data 232 that has been marked as blocked may still be available to the application 208 unless additional steps are taken. If made available, breaches of data privacy or data protection policies may occur. In a particular example, data views 224 are annotated to include filters that will exclude blocked data from results provided in response to a request, including data provided to a machine learning algorithm 220 in response to a request from an application 208. A data view 224, in a specific example, can include query language statements to exclude blocked data. A portion of a suitable view definition can include statements such as:

define view TrainingInput as select from <TableName> where <BlockedField> < > 'x' where TrainingInput is the data view 224 being defined, <TableName> is the name of a table in a data store holding application data 232, <BlockedField> is the field of that table holding flag information about whether records are blocked, < > represents the "not equal" operator, and a value of "x" indicates that data is blocked. Other examples of such a statement are:

define view TrainingInput as select from <TableName> where <BlockedField>==False; or define view TrainingInput as select from <tableName> where <BlockedField>==0;

One or more components of the computing system 200 can be configured to create or modify data views 224 for machine learning applications 208, where the data view restricts access to blocked data as described above. For example, the application 208 can be configured to create a data view 224 that includes such restrictions, or to modify an existing data view that does not include such restrictions to include such restrictions (including creating a new view that is the same as an old view except that blocked data is not retrieved). Analogous functions can be performed by the API 216 or another portion of a framework that provides access to machine learning services.

While in some cases a user can manually define a data view 224 to exclude blocked records, it can be beneficial to automatically prevent access to blocked records. Automatically including a filter for blocked records in a data view 224 can increase compliance, as individual users may not know, or may forget, to manually include such filters, and can help avoid malicious use that may occur if filters for blocked data are not automatically added to a data view.

Example 3

Example Static SQL Statement for Restricting Access to Protected Data

Example 2 described how data views, such as the data views 224 of FIG. 2, can be used to restrict access to blocked data. Similar techniques can be employed to restrict access to active records, such as by limiting access to the application data 232 to data that is associated with consent for the intended use, where the intended use can be machine learning, generally, or for a particular purpose associated with a particular machine learning task (e.g., a particular purpose associated with an algorithm 220, a trained model 212, or a call through the API 216).

A consent policy can include a variety of features. Typical features include an identifier of a data subject (e.g., a social security number, an employee ID, a name, etc.) and an identifier of a data subject type (e.g., patient, employee), which type may be associated with a numeric identifier (which can be unique to the named type, or the "named" type can be a species of a genus represented by the numeric identifier). Similarly, a data subject may be associated with an entity, a data controller, who controls the data subject's data. In some cases, a single entity may have multiple data controllers, such as having a data controller associated with a HR department, a data controller associated with a payroll department, and a data controller associated with a particular operating unit of the enterprise. The data controller can have an identifier, such as a name or other numeric or alphanumeric value (e.g., "HumanResources"), and can be associated with a type, which type can be associated with a numeric identifier (which can be unique to the named controller, or the named controller can be a species of a genus represented by the numeric identifier).

Even for the same data subject and the same data controller, some data may be associated with consent, and other data not associated with consent. Or, different data may be associated with different types of consent, such as consent for the use of data for different purposes (e.g. data X can be used for purpose one only, data Y can be use for purpose two only, data Z can be used for purposes one and two only). Purposes (and other consent-related features, such as data subject types or controller types) can also be used for archival/blocking purposes, such as being included in the rules 256 of FIG. 2. Accordingly, data may associated with a type identifier (e.g., "HealthRecords," "FinancialRecords").

Purposes can also be associated with one or more identifiers, such as an identifier representing an action/use for the data (e.g., "profiling") and an aspect associated with the purpose, where an aspect can be a subject area associated with the purpose (and action/use), such as for a "material" supplier. In some cases, an "aspect" can be related to a particular abstract data type or object in an object oriented programming language (including a logical data object, such as a BusinessObject as used in products available from SAP SE, of Walldorf, Germany). Abstract data types/objects can be correlated with data in a database, such as using an object-relational mapping.

One or more consent-related metadata features can be included in a data view 224 to restrict data that will be available through the data view, including being returned to a machine learning algorithm 220. These features can be expressed as conditions in a query, such as expressed as conditions in a query language like SQL. Examples of conditions can be:

DataSubjectID=Patient && DataSubjectIdType=3
ControllerName=Hospital && ControllerType=2
PurposeFunctionalAtrribute~action='Profiling'
PurposeFunctionalAttribute~aspect='Material'
Table1~AttributeX='HealthRecord'

Relevant consent-related conditions can be combined in a data view 224. For instance, FIG. 3 illustrates an example SQL select statement 300 that can be included in a data view 224 to restrict information retrieved to that meeting particular criteria. As illustrated, the select statement 300 includes inner joins between a table with application data (or data subject data), I_SALESORDER, with data from two consent-related tables: CMD_CNSNT and PurposeEntityFunctionalAttributes. The various conditions in the select statement 300 can be categorized as relating to data subject matching 320 (shown as 320a, 320b), such as a clause 320a selecting data for a particular data subject name (e.g., a class of data subjects, not necessarily a single data subject, where returned records may be associated with a particular data subject, such as a particular employee or patient), Sold-ToParty, and a clause 320b selecting data for a particular type (3, representing a customer).

Conditions 324 (shown as 324a, 324b) relate to particular data controllers. In particular, condition 324a requires a BillingCompanyCode field of I_SALESORDER to match a CONTROLLER_NAME field of the CMD_CNSNT table. Condition 324b further restricts returned records to those where the CONTROLLER_TYPE field of the CMD_CNSNT table is equal to 1, representing a company code.

Conditions 328 (shown as 328a, 328b) further restrict returned records based on purpose-matching. That is, condition 328a requires a match between values of the purpose_name column of the PurposeEntityFunctionalAttribute table and the PURPOSE_NAME column of the CMD_CNSNT table. Condition 328b further restricts relevant records to those having a value of "I_SALESORDER" for the cds_view_name attribute of the PurposeEntityFunctionalAttributes table.

Conditions 332 and 336 (shown as 336a-336c) provide finer-grain purpose matching, such as functional attribute matching. Condition 332 restricts returned results to those having the value of 'OR' (e.g., representing an order) for the SalesOrderType attribute of the I_SALESORDER table. Condition 336a requires a match between the purpose_name attribute of the PurposeFuntionalAttribute table and the PURPOSE_NAME attribute of the CMD_CNSNT table. Condition 336b restricts results to those having a value of "Profiling" for the action attribute of the PurposeFunctionalAttributes table, while condition 336c restricts results to those having a value of "Material" for the aspect attribute of that table.

Conditions 340 (shown as 340a, 340b) restrict records where a date-based consent is valid based on a date associated with execution of the statement 300. Specifically, the subset of conditions 340a retrieves records where consent has not been withdrawn and consent is either valid up until the present time or is valid starting from the present time. Subset of conditions 340b is similar to subset 340a, except that it also retrieves records where consent will be withdrawn, provided that the withdraw of consent is set to occur at date later than the present time.

Statements having a similar format to the statement 300 can be included in, or referenced by, a view definition, such as in a similar manner as to implement the "blocking" described in Example 2. That is, statements similar to the statement 300 can be included in a view definition manually, by a user, or can be automatically included in a view definition created for a machine learning application, including being added to another view definition.

Example 4

Example Dynamic SQL Statement for Restricting Access to Protected Data

Figure 4:
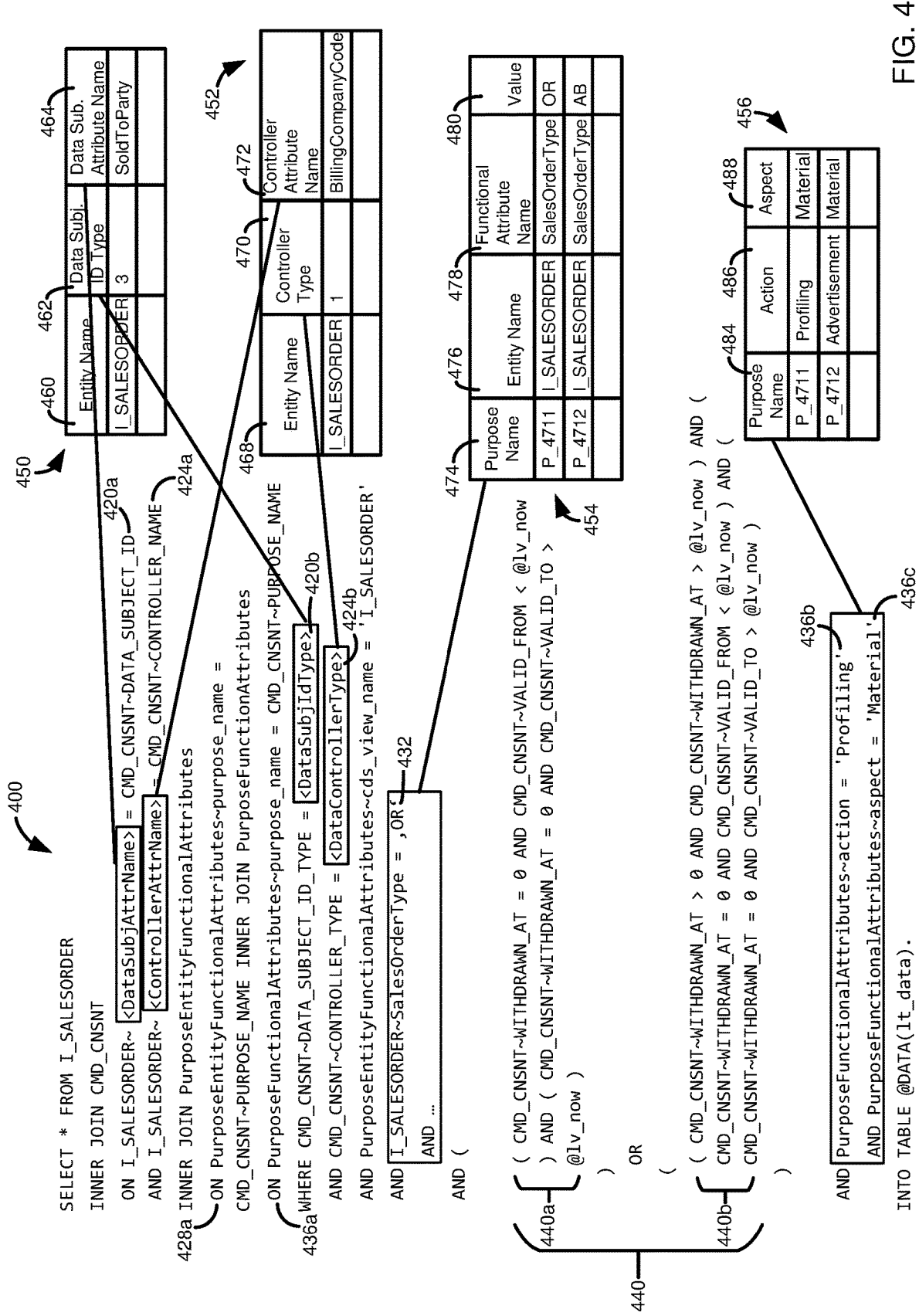
FIG. 4 is an example dynamic SQL statement that can be used in a data view to restrict data accessed by a machine learning algorithm to data that complies with a data protection or data privacy policy, such as being associated with data subject consent.

The query language statement 300 of FIG. 3 represents a static query language statement—one where all of the conditions are fixed. In some cases, such static query language statements can be used, but they can be more cumbersome, as a change to any of the conditions may result in a new statement being needed. FIG. 4 illustrates a query language statement 400 that can accomplish a similar purpose as the query language statement 300, except that specific values for the conditions 320, 324 have been replaced with variables (or placeholders) in corresponding conditions 420, 424. When the query language statement 400 is to be executed, these conditions can be instantiated with the values desired for the particular execution of the statement. The conditions 428, 432, 436, 440 are shown as having the same content as the corresponding conditions 328, 332, 336, 340. However, in further implementations, some or all of the conditions 328, 332, 336, 340 can be replaced with dynamic SQL statements.

FIG. 4 also illustrates how elements of various conditions (e.g., the conditions 420, 424, 428, 432, 436) can be associated with tables 450, 452, 454, 456. Although not shown in FIG. 3, one or more of the conditions shown in FIG. 3 can be associated with a corresponding table, in an analogous manner as in FIG. 4. In FIG. 4, the conditions 420 are associated with the table 450, where the table 450 provides information regarding attributes of a data subject, such as including a column 460 for an entity name (e.g., a table or view name) attribute, a column 462 for a data subject identifier type attribute (e.g., a particular type or category of data subject), and a column 464 for a data subject attribute name. Thus, conditions 420 and table 450 facilitate retrieving records where consent information (e.g., recorded in the CMD_CNSNT table, which can have attributes such as controller_name, data_subject_id, data_subject_id_type, or controller_type) is joined with application data in the I_SALESORDER table, and relevant records are those having a matching data subject identifier (condition 420a) and a matching data subject identifier type (420b). Examples of the CMD_CNSNT table and the I_SALESORDER table are provided in products available from SAP, SE, of Walldorf, Germany.

The table 452 provides data that can provide information regarding attributes of a data controller. The table 452 includes a column 468 for an entity name (which can be equivalent to the entity name column 460 of the table 450), a column 470 for a controller type, and a column 472 for a controller attribute name. The conditions 424 can be associated with the table 452, facilitating retrieving records when consent information is joined with application data, and relevant records are those having a matching controller type (condition 424a) and a matching controller attribute name (condition 424b).

The table 454 provides data regarding particular types of data (e.g., health records, order records) and particular purposes (e.g., data use purposes under a data protection and/or data privacy policy) that are associated with such types of data. Accordingly, the table 454 includes a column 480 having a value representing the type of data, and a column 478 provides a functional attribute name for the type of data indicated by the value for the record in the column 480. The table 454 incudes a column 476 providing the entity name associated with a given record, and a column 474 indicating a particular purpose associated with the record. The properties of the purpose listed in column 474 can be further described in the table 456.

Note that a given value designating a particular type of data can be associated, in at least some cases, with multiple entities (e.g., different values in column 476) or multiple purposes (e.g., different values in column 474). A given value for the functional attribute name column 478 can be associated with different entity names or purposes, but also with different values for the column 480. That is, for example, the table 456 illustrates that the "I_SALESORDER" entity (e.g., table or view) includes two types of the functional attribute name SalesOrderType, which types are associated with different values in the column 480, and with different purpose names in the column 474. The table 454 can be used in evaluating the condition 432, including being useable to retrieve a purpose name that can be used in evaluating the conditions 436.

The table 456 includes information further describing a particular data use purpose, such as a purpose corresponding to a value provided in the column 474 of the table 454. The table 456 includes a column 484 listing the name of a particular purpose (e.g., corresponding to the column 474 of table 454), a column 486 identifying an action associated with the purpose, and a column 488 identifying an aspect associated with the purpose. As describe above, in the statement 400, the value provided in the condition 432 can be used to determine a particular purpose for the statement.

The values for action and aspect provided in the conditions 436b, 436c, used in evaluating the join condition 436a, can be compared with the values in columns 486, 488 of the table 456, to determine whether the values provided in the statement 400 are consistent with the given value of the purpose column 484. Although not shown in FIG. 4, it should be appreciated that a given value for the purpose name column 484 can be associated with multiple records, providing different values for the action column 486 or the aspect column 488. Similarly, a given value for the action column 486 or the aspect column 488 can be associated with different values of the other column, and for different values of the purpose name column 484. For example, multiple purpose names may be associated with the value of "Advertisement" in the action column 486.

Statements having a similar format as the statement 400 can be included in, or referenced by, a view definition, such as in a similar manner as in implementing the "blocking" described in Example 2. That is, statements similar to the statement 400 can be included in a view definition manually, by a user, or can be automatically included in a view definition created for a machine learning application, including being added to another view definition. A statement having the form of the statement 400 can be more flexible than a statement having the form of the statement 300, as the same view definition can be used with multiple different parameters that may be requested for a machine learning application.

Example 5

Example Cloud-based System Cooperating with Local System to Exchange Use Status Information or to Access Data Views Technologies disclosed in Examples 2-4 can be particularly useful in a "local" environment, where the local environment may include separate computer systems (e.g., an application layer may operate on one computer system and access data housed on another computer system), but where any multiple computer systems are configured to function together as a unit. However, the technologies of Examples 2-4 can be adapted for use in scenarios where a local environment interacts with a remote environment, such as a local system interacting with a cloud-based system.

Figure 5:
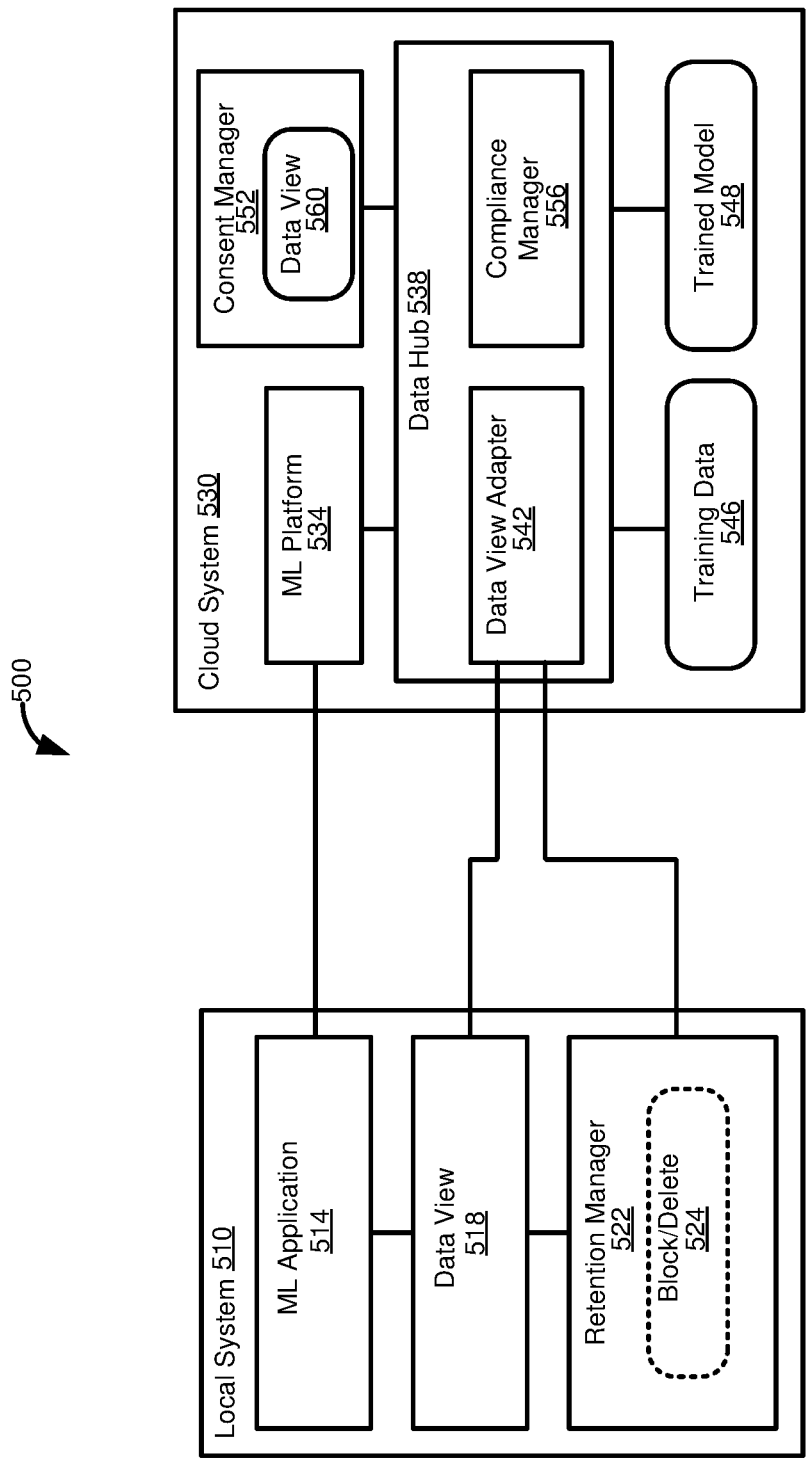
FIG. 5 is a diagram of a system architecture having a local system and a cloud-based system, where the cloud-based system can access data annotations by a retention manager of the local annotations or data views of the local system, in each case restricting data provided to a machine learning application of the cloud-based system to data complying with a data protection or data privacy policy.

FIG. 5 illustrates a computing environment 500 that includes a local system 510 and a cloud-based system 530. The local system 510 includes one or more machine learning applications 514 (which can also be functions provided by another application). The machine learning applications 514 can access data through one or more data views 518, where a data view can be implemented as described in Examples 2-4, in at least some implementations. Consistently, the local system 510 can include a retention manager 522, which can be implemented as described for the retention manager 236 of FIG. 2, including carrying out operations 524 to mark data as blocked or to delete data (e.g., delete data from an archive or from a repository of otherwise active data).

The cloud-based system 530 can include a cloud-based machine learning platform 534. In some cases, the local system 510 can request the machine-learning platform 534 to carry out machine learning tasks on behalf of the local system. For instance, the machine-learning platform 534 may provide analyses that are not available to be performed by the machine learning application 514 (or otherwise at the local system 510). The machine-learning platform 534 may be able to provide greater functionality due to a larger amount of computing resources (e.g., memory and processor capacity/speed) at the cloud-based system 530. In some cases, even if tasks can be performed at the local system 510, it may be preferable to have them executed by the cloud-based system 530 to preserve the resources of the local system, or to expedite processing of the task.

The machine-learning platform 534 can access a data hub 538 that is part of, or available through, the cloud-based system 530. The data hub 538 can store data for processing by the machine-learning platform 534, including storing data provided by, or on behalf of, the local system 510. The data hub 538 can include a data view adapter 542 for retrieving information from a data view 518 (e.g., obtaining a copy of a data view 518 or executing such as data view). When the local system 510 is implemented as described in Examples 2-5, the data view 518 can restrict data provided to the data hub 538 via the data view adapter by excluding blocked data and confirming that retrieved data complies with consent restrictions specified in the data view 518. In at least some cases, in addition to receiving data for a particular task when the task is initiated, the data hub 538 can receive data updates from the local system 510, such as adding, deleting, or updating records compared with an initial set of data.

In some cases, the data hub 538 can store training data 546 or a trained machine learning model 548. Although not shown, the data hub 538 can store other information, such as data to be analyzed using a trained model 538, or data that is intended to be used with a machine learning component, but which has not yet been designated as training data, data to be analyzed, etc.

Issues can arise regarding data that is initially received by the data hub 538 in compliance with data protection or data privacy considerations, but whose use status later changes. For example, initially received data may not be marked as blocked, and may be associated with consent, and thus available for use. However, after the data is stored in the training data 546, the status of a data element (e.g., a record or collection of records) can change. For example, a data element may have its status changed from "no flag" to "blocked" or from "no flag" to deleted. In either the case, the machine learning platform 534 should not use the data element, including in creating (or updating) a trained model 548.

The cloud system 530 can include a consent manager 552 and a compliance manager 556. The compliance manager 556 can be configured to query the retention manager 522, or receive notifications from the retention manager, regarding status changes for data elements stored by the data hub 538, including data stored as training data 546. The operation of the compliance manager 556 will be further described in Example 6.

The consent manager 552 can implement one or more of the technologies described in Examples 3 and 4. For example, the consent manager 552 can implement data views 560 that include statements having the form of the statement 300 or the statement 400, or similar statements can otherwise be implemented to restrict records returned/use to those that are associated with the proper consent. In some cases, all or a portion of a data view 560 can be supplied by a machine-learning application 514 or another component of the local system 510.

Example 6

Figure 6:
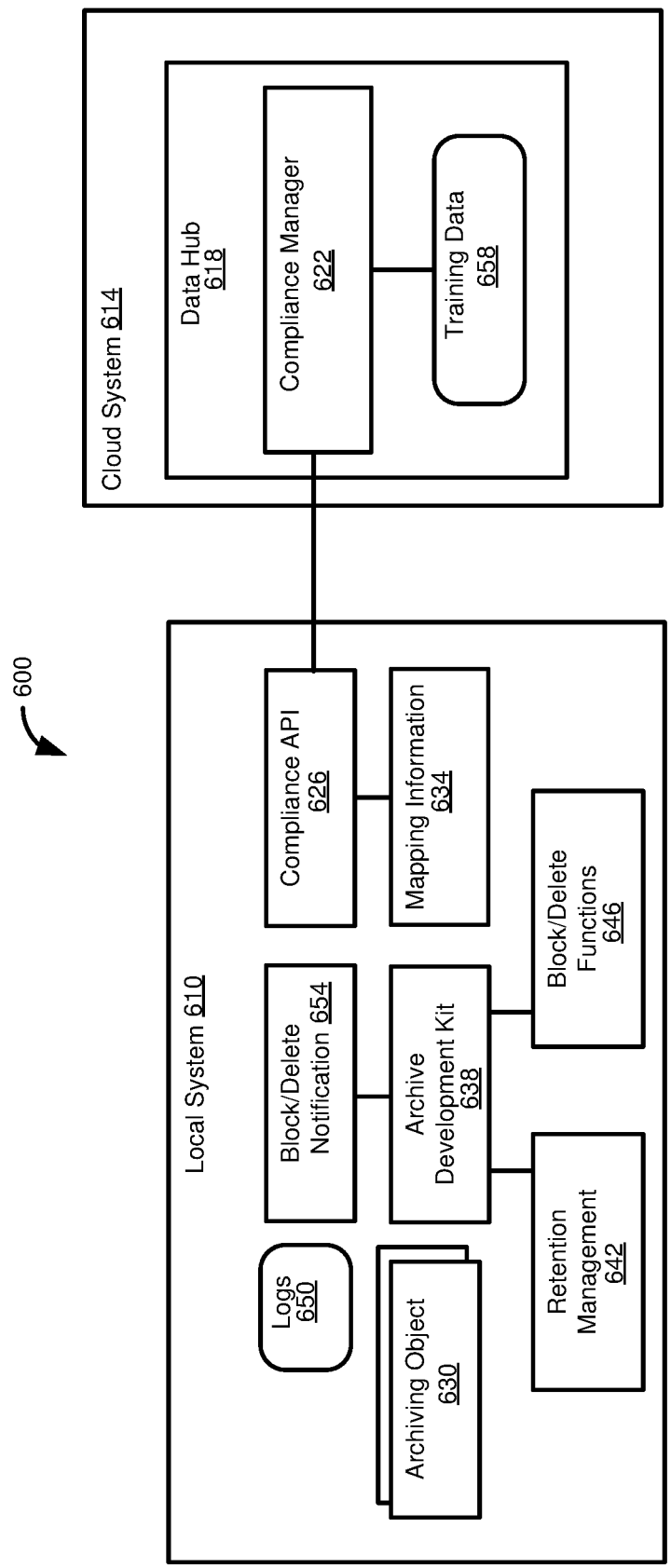
FIG. 6 is a diagram of a system architecture having a local system and a cloud-based system, where the cloud-based system can access data annotations by a retention manager of the local annotations or data views of the local system, in each case restricting data provided to a machine learning application of the cloud-based system to data complying with a data protection or data privacy policy, such as through an API provided by the local system.

Example Local System with API for Exchanging Use Status Information with Cloud-based System FIG. 6 is a diagram of a computing environment 600 that includes a local system 610 and a cloud-based system 614, which can at least generally correspond to the local system 510 and the cloud-based system 530 of FIG. 5. A data hub 618 of the cloud-based system 614, which can at least generally correspond to the data hub 528, can include a compliance manager 622, which can at least generally correspond to the compliance manager 556. The compliance manager 622 can communicate with a compliance API 626 of the local system 610.

In various implementations, the API 626 can operate in a "pull" mode, a "push" mode, or in both modes. In a "pull" mode, the compliance manager 622 can request updates of data status changes that may have occurred with respective to archiving objects 630 of the local system 610, wherein an archiving object can identify one or more data records, a use status associated with the one or more data records, and one or more retention policies that apply to the one or more data records.

In some cases, the compliance manager 622 may refer to data associated with an archiving object 630 using an identifier other than an identifier of the archiving object 630. The local system 610 (or optionally the cloud-based system 614) can include mapping information 634. The mapping information 634 can be, in some cases, a table that maps data as known by the compliance manager 622 to a corresponding archiving object 630, such as mapping a primary key of a database record to an identifier of an archiving object.

In some cases, applications can direct the local system 610, such as an archive development kit 638 (which can provide functions associated with the retention manager 236 of FIG. 2) to change the status of data associated with an archiving object 630. In other cases, the archive development kit 638 can process archiving objects 630 according to a retention policy, such as implemented by a retention management component 642. That is, for example, the retention management component 642 can determine whether conditions associated with an archiving object 630 (e.g., a retention policy) indicate that a status associated with an archiving object should be updated. In some cases, a condition can be the passage of a period of time or the satisfaction of date or other criteria, which can cause the status of an archiving object 630 to be updated, such as from "active" to "blocked," from "active" to "deleted," or from "blocked" to "deleted."

Status changes can be implemented by the archive development kit 638 by calling block/delete functions 646, as appropriate. Status changes, in at least some cases, can be reflected in logs 650. Similarly, when a block or delete notification 654 is received by the archive development kit 638 (such as a block or delete notification provided by an application associated with the local system 610), the corresponding action can be taken by calling the block or delete functions 646, and one or both of the notification or the block/delete action can be included in the logs 650.

In a particular implementation, a "pull" request received by the compliance API 626 from the compliance manager 622 can be executed by scanning the logs 650 for updates made to data specified in the pull request, or which are otherwise associated with a particular pull request. For example, particular models or data collections can be associated with an identifier, and data associated with the models or data collections can be indicated in a profile maintained for that model or data collection. The profiles can be stored, including as part of the mapping information 634 or in another repository on, or accessible to, the local system 610.

When a "pull" request is received from the compliance manager 622 by the compliance API 626, the compliance API can determine any status updates to data associated with the request. Any such status updates can be returned in response to the request and the compliance manager 622 can take appropriate action. For example, when data is indicated as blocked or deleted, the compliance manager 622 can delete, or cause to be deleted, the corresponding data from the data hub 618, including from a training data store 658.

Profile information can be used to implement "push" notifications to the compliance manager. For example, when a notification is received to block or delete data, or such action is indicated by the retention management component 642, the archive development kit 638 (or another component of the local system 610) can scan profiles to determine whether any profiles are associated with the data whose status has changed. If a profile is associated with the data whose status is changed, a notification of the change in status can be sent by the compliance API 626 to the compliance manager 622. The compliance manager 622 can then take appropriate action, such as deleting data, including from training data 658, when such data has been indicated as becoming blocked or marked for deletion.

Example 7

Example Schema for Storing Data Use Restriction Information

FIG. 7 illustrates a table 700 that describes various data retention properties that may be maintained. The table 700 can represent mapping information 634 of FIG. 6. In some cases, the logs 650 can include some or all of the information in the table 700.

In the table 700 a column 710 provides attribute or properties, which can be attributes in another table having records providing use status information for particular data subject data. That is, the table 700 can define a table schema, with columns corresponding to the attributes in the column 710. A column 714 lists a type for the property of the column 710. Columns 718 and 722 are, respectively, a data type and a field length for the property of the column 710. The column 726 provides a description of the property listed in column 710.

A component 730 is associated with a record ID. A record ID can be a primary key identifying a unique record in a table instantiated having the schema set forth in the table 700. A component 732 can provide information regarding a data source associated with the record, such as a particular application or other source of the record. A component 734 can associate the record with an archiving object, such as an archiving object 630 of FIG. 6.

A component 736 can indicate a notification mode associated with a record. A notification mode can be, in some cases, "pull" or "push," and can be used to indicate how or when a notification should be provided to a cloud-based system of a status change to the corresponding record. In other cases, the notification mode component 736 can be used for other purposes, such as recording a mode in which a notification was provided of a status change to a record in a table defined according to the schema of the table 700.

A component 738 can provide a timestamp associated with the notification of the component 736. When the notification of the component 736 is used to indicate how notifications are provided to a cloud-based system, the component 738 can be used to indicate that a status change associated with the particular record was sent to the cloud-based system. When the component 736 is used to track status change requests from applications, the component 738 can record when the notification was received.

In some cases, status changes can be sent, or at least recorded, by indicating dates associated with a status change, such as a date on or after which a record will be marked as blocked, which can be provided in a component 742, or a date on or after which a record will be marked as deleted, which can be provided in a component 746. If the information in component 742 or 746 is provided to a cloud-based system, the cloud-based system can determine, such as based on a current date, whether the associated data is available for use or should be deleted. In other cases, the information in the component 742 or 746 can be analyzed by a local system, and a delete notification provided to the cloud-based system (e.g., "delete record 12345").

A component 750 can associate a particular data record with a particular GUID. A source GUID can indicate how data first entered a system (e.g., came into the possession of a data controller). A component 752 is associated with key values, the key values can associate one more data elements or objects (including table records) with a particular record ID 730 of a table having the schema of the table 700. The key values can be values used to access the corresponding data by a machine learning application, and can be used to map such data to a particular archiving object as indicated by the value for the archiving object component 734.

Example 8

Example Operations in Facilitating Machine Learning Compliance with Data Use Restrictions FIG. 8A illustrates a method 800 for restricting data available to a machine learning application using use status information, such as use status annotations provided by a retention manager. The method 800 can be carried out, for example, using the architecture 100 of FIG. 1 or the architecture 200 of FIG. 2.

At 804, a request is received from or on behalf of a machine learning application for data stored in a data store, such as data maintained in a relational database. A data view associated with the request is retrieved at 806. The data view includes computer-implementable instructions to retrieve a first selected portion of data from the data store. The computer-implementable instructions also include instructions to filter, and not return in response to the request, a second portion of data selected from the first selected portion of data. The second portion of data, that is not returned, corresponds to data of the first selected portion of data having an indicator that a given data element of the first selection portion of data has been blocked from use.

At 808, the computer-implementable instructions are caused to be executed. For example, the instructions can cause a query to be executed at the database. Query results are received at 810 in response to the execution of the computer-implementable instructions. The query results are sent as a response to the request at 812.

FIG. 8B illustrates a method 820 for using a data view that includes a query language join operation to restrict data provided to a machine learning application to data that complies with a data protection or data privacy policy, such as data that is associated with consent of a data subject that permits the data to be used by the machine learning application. The method 820 can represented, at least in part, by the statement 300 of FIG. 3 or the statement 400 of FIG. 4.

At 822, a data view is defined for use with a machine learning application. The data view includes computer-implementable instructions for retrieving data from a database. The data view includes a reference to at least a first column of a first table of a relational database system. The first table stores data processible by the machine learning application. The data view includes a reference to at least a second column of a second table of the relational database system. The second table stores consent information. The data view includes a query language join condition on the at least a first column and the at least a second column.

A request is received at 824 from or on behalf of a machine learning application for data stored in a data store, such as the relational database system. At 826, it is determined that the data view is associated with the request. The data view is retrieved at 828. At 830, the computer-implementable instructions of the data view are caused to be executed. Query results are received at 832 in response to the execution of the computer-implementable instructions. At 834, the query results are sent as a response to the request.

FIG. 8C illustrates a method 850 for providing use status information to a remote computing system. The method 850 can be carried out, for example, using the architecture 500 of FIG. 5 or the architecture 600 of FIG. 6, and can use a table having the schema defined in the table 700 shown in FIG. 7.

At 852, a first plurality of first data objects are provided. A first data object, generally, includes one or more first data elements and comprises first data subject data processable by a machine learning application. A second plurality of archiving objects are provided at 854. An archiving object can define a use status of one or more second data objects. A second data object can include, or can be associated with, one or more second data elements. The second data elements can be second data subject data, which can be, or can correspond to, first data subject data. For example, an archiving object can include a reference to data of the first plurality of data objects, or can have data that is equivalent to data of the first plurality of data objects.

At 856, at least a portion of the first plurality of first data objects are mapped to an archiving object of the second plurality of archiving objects. The at least a portion of the first plurality of data objects are correlated with respective archiving objects of the second plurality of archiving objects, at 858, based on the mapping. At 860, use status information of the respective archiving objects is determined. The use status information of the respective archiving objects is correlated at 862 with the respective at least a portion of the first plurality of first data objects based on the mapping. At 864, at least a portion of the correlated use status information is sent to a remote computer system.

Example 9

Computing Systems

Figure 9:
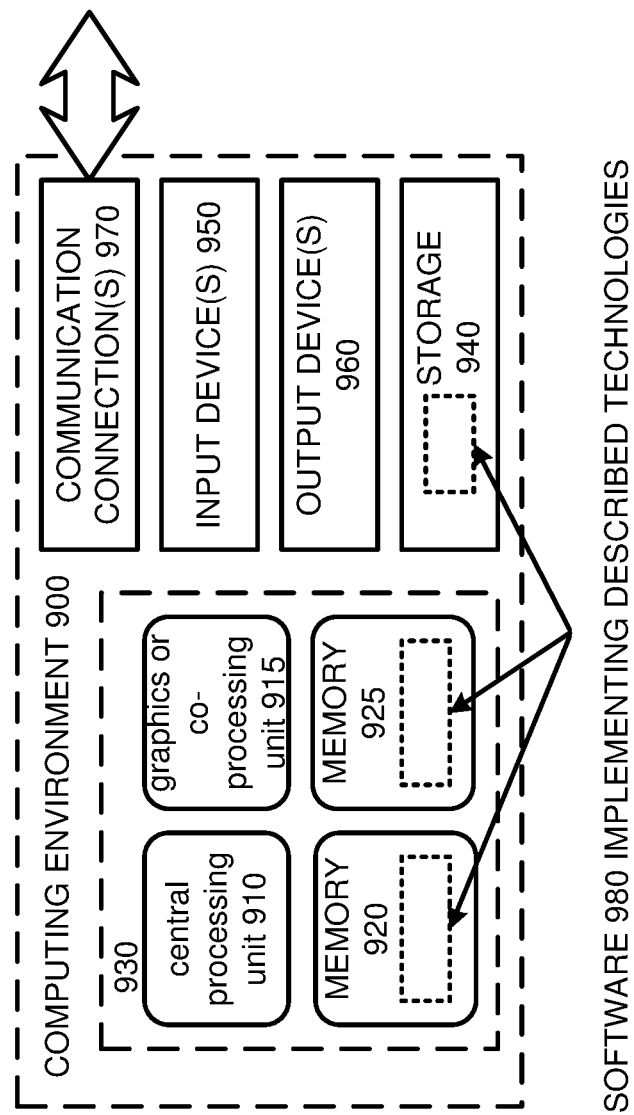
FIG. 9 is a diagram of an example computing system in which some described embodiments can be implemented.

FIG. 9 depicts a generalized example of a suitable computing system 900 in which the described innovations may be implemented. The computing system 900 is not intended to suggest any limitation as to scope of use or functionality of the present disclosure, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions, such as for implementing components of the computing environment 100 of FIG. 1, the computing environment 200 of FIG. 2, the computing environment 500 of FIG. 5, or the computing environment 600 of FIG. 6, including as described in Examples 1-8. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s) 910, 915. The memory 920, 925 stores software 980 implementing one or more innovations described herein, in the form of computer-executable instructions suitable for execution by the processing unit(s) 910, 915.

A computing system 900 may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10

Cloud Computing Environment

Figure 10:
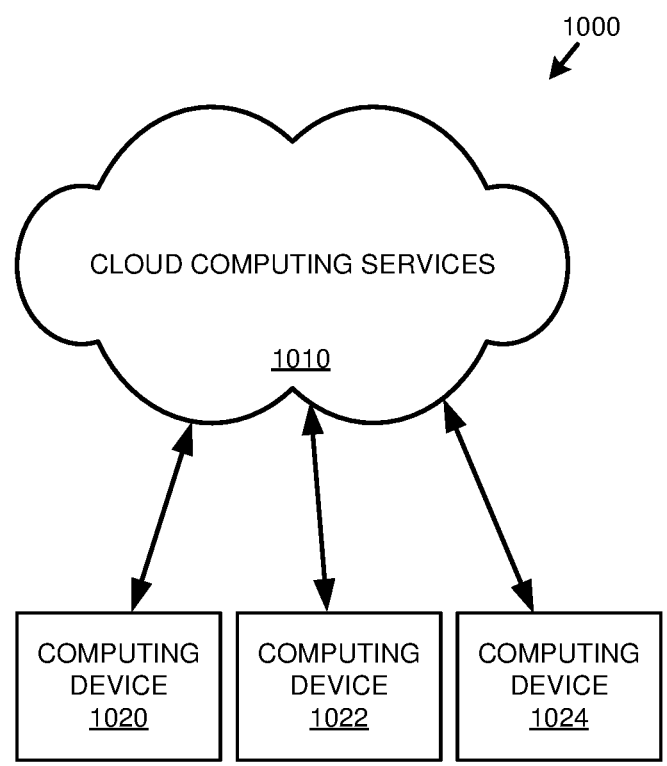
FIG. 10 is an example cloud computing environment that can be used in conjunction with the technologies described herein.

FIG. 10 depicts an example cloud computing environment 1000 in which the described technologies can be implemented. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operators (e.g., data processing, data storage, and the like).

Example 11

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 9, computer-readable storage media include memory 920 and 925, and storage 940. The term computer-readable storage media does not include signals and carrier waves. In addition, the term computer-readable storage media does not include communication connections (e.g., 970).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one memory;
   at least one hardware processor coupled to the at least one memory; and
   one or more non-transitory computer readable storage media storing instructions that, when executed, cause the computing system to perform operations comprising:
   receiving a request from or on behalf of a machine learning application for data stored in a data store;
   retrieving a data view associated with the request, the data view comprising computer-implementable instructions that, when executed, cause the computing system to:
   (1) retrieve a first selected portion of data from the data store;
   (2) identify an indicator within the first selected portion of data, wherein the indicator indicates that one or more data elements of the first selected portion of data have been blocked from use;
   (3) identify a second portion of data selected from the first selected portion, wherein the second portion of data corresponds to the one or more data elements of the first selected portion of data that have been blocked from use; and
   (4) block from use, and preventing from returning in response to the request, the second portion of data selected from the first selected portion of data;
   causing the computer-implementable instructions in the data view to be executed;
   receiving query results in response to the execution of the computer-implementable instructions; and
   sending the query results as a response to the request.

2. The computing system of claim 1, wherein the computer-implementable instructions are in a query language.

3. The computing system of claim 1, wherein the computer-implementable instructions corresponding to the indicator comprise a condition on an attribute of a table in a relational database system.

4. The computing system of claim 1, the operations further comprising:
   receiving, by the data store, instructions from a retention manager to update a status associated with a record of the data store from an unblocked status to a blocked status.

5. The computing system of claim 1, wherein the instructions from a retention manager are based on a data privacy or data protection policy.

6. The computing system of claim 1, the operations further comprising:
   automatically creating the data view in response to receiving the request.

7. The computing system of claim 6, wherein the automatically creating the data view is carried out in further response to determining that the request is associated with the machine learning application.

8. The computing system of claim 7, further comprising storing the data view.

9. A method performed in a computing system comprising at least one memory and at least one hardware processor coupled to the at least one memory, the method comprising:
   defining a data view for use with a machine learning application, the data view comprising computer-implementable instructions for retrieving data from a database, the computer-implementable instructions comprising:
   (1) a reference to at least a first column of a first table of a relational database system, the first table storing data processible by the machine learning application;
   (2) a reference to at least a second column of a second table of the relational database system, the second table storing consent information, wherein the consent information indicates that one or more data elements of the data stored in the first table have been blocked from use; and
   (3) a query language join condition on the at least a first column and the at least a second column;
   receiving a request from or on behalf of a machine learning application for data stored in a database;
   determining that the data view is associated with the request;
   retrieving the data view;
   associating the data stored in the first table with the consent information stored in the second table through the query language join condition;
   identifying a first portion of data selected from the data stored in the first table, wherein the first portion of data corresponds to the one or more data elements of the data stored in the first table that have been blocked from use;
   blocking from use, and preventing from returning in response to the request, the first portion of data selected from the data stored in the first table;
   causing the computer-implementable instructions to be executed;
   receiving query results in response to the execution of the computer-implementable instructions; and
   sending the query results as a response to the request.

10. The method of claim 9, wherein the defining occurs automatically in response to the receiving of the request.

11. The method of claim 9, wherein the at least a first column and the at least a second column represent a data subject attribute name.

12. The method of claim 9, wherein the join condition is further on at least a third column of the first table and at least a fourth column of the second table, the at least a third column and the at least a fourth column representing a data controller attribute name.

13. The method of claim 9, the computer-implementable instructions further comprising:
   filtering records produced at least in part from the query language join condition on a purpose type, wherein the purpose type is a purpose type specified for the machine learning application.

14. The method of claim 9, the computer-implementable instructions further comprising:
  filtering records produced at least in part from the query language join condition by comparing a current time with a consent validity time.

15. The method of claim 9, wherein at least a portion of the computer-implementable instructions are implemented in a dynamic query language statement.

16. The method of claim 15, wherein at least a first value for the at least a first column and at least a second value for the at least a second column are provided in the request and inserted into the dynamic query language statement.

17. One or more tangible computer-readable storage media storing:
  computer-executable instructions that, when executed by a computing system comprising at least one hardware processor and at least one memory coupled to the at least one hardware processor, cause the computing system to provide a first plurality of first data objects, a first data object comprising one or more first data elements and being first data subject data processable by a machine learning application;
  computer-executable instructions that, when executed by the computing system cause the computing system to provide a second plurality of archiving objects, an archiving object defining a use status of one or more second data objects, a second data object comprising, or being associated with, one or more second data elements, the second data elements being second data subject data, which can be, or can correspond to, the first data subject data;
  computer-executable instructions that, when executed by the computing system cause the computing system to map each of at least a portion of the first plurality of first data objects to an archiving object of the second plurality of archiving objects;
  computer-executable instructions that, when executed by the computing system cause the computing system to correlate the at least a portion of the first plurality of first data objects with respective archiving objects of the second plurality of archiving objects based on the mapping;
  computer-executable instructions that, when executed by the computing system cause the computing system to determine the use status information of the respective archiving objects, wherein the use status information comprises an indicator indicating that a first portion of the respective archiving objects has been blocked from use;
  computer-executable instructions that, when executed by the computing system cause the computing system to correlate the use status information of the respective archiving objects with the respective at least a portion of the first plurality of first data objects based on the mapping;
  computer-executable instructions that, when executed by the computing system, cause the computing system to determine that a second portion of the respective at least a portion of the first plurality of first data objects is correlated with the first portion of the respective archiving objects that have been blocked from use as indicated by the use status information;
  computer-executable instructions that, when executed by the computing system, cause the computing system to block from use, and prevent the second portion of the respective at least a portion of the first plurality of first data objects from being sent to a remote computer system; and
  computer-executable instructions that, when executed by the computing system, cause the computing system to send at least a portion of the correlated use status information to the remote computer system.

18. The one or more tangible computer-readable storage media of claim 17, further comprising:
  computer-executable instructions that, when executed by the computing system, cause the computing system to receive a request for use status information of a first portion of the first plurality of first data objects, wherein the sending occurs in response to the request.

19. The one or more tangible computer-readable storage media of claim 17, further comprising:
  computer-executable instructions that, when executed by the computing system, cause the computing system to receive a request from a remote computer system to receive use status updates for the at least a portion of the first plurality of first data objects;
  computer-executable instructions that, when executed by the computing system, cause the computing system to determine that a data object of the at least a portion of the first data objects has a status update; and
  computer-executable instructions that, when executed by the computing system, cause the computing system to send a notification of the status update to the remote computer system.

20. The one or more tangible computer-readable storage media of claim 17, wherein the remote computing system causes at least one of the first data objects to be deleted from storage associated with the remote computer system in response to receiving the at least a portion of the correlated use status information.

* * * * *